April 14, 1970    E. WÜSTENHAGEN    3,506,252
PNEUMATIC SUSPENSION FOR AUTOMOTIVE VEHICLES
Filed June 3, 1968

INVENTOR
ERNST WÜSTENHAGEN
BY
Michael S. Stricker
ATTORNEY

United States Patent Office 3,506,252
Patented Apr. 14, 1970

3,506,252
PNEUMATIC SUSPENSION FOR AUTOMOTIVE
VEHICLES
Ernst Wüstenhagen, Gmunder Strasse 124, Durlangen,
near Schwabisch Gmund, Germany
Filed June 3, 1968, Ser. No. 733,897
Claims priority, application Germany, June 3, 1967,
H 62,918
Int. Cl. B60g 11/26
U.S. Cl. 267—65        10 Claims

ABSTRACT OF THE DISCLOSURE

The pressure vessel of a pneumatic suspension arrangement for automotive vehicles comprises two receptacles which define chambers for supplies of highly and less compressed gas and are connected to each other by an anchor which accommodates the piston of a compressor serving to deliver gas from the lower-pressure chamber to the higher-pressure chamber when the gas pressure in the latter chamber drops below a fixed minimum value. Each shock absorber is connected with the pressure vessel by a single conduit and the flow of gases between the chambers and the conduits is regulated by valves which are installed directly in the chambers of the pressure vessel and receive impulses from detectors which respond to changes in the condition of shock absorbers.

BACKGROUND OF THE INVENTION

The present invention relates to improvements in suspension arrangements for use in automotive vehicles, and more particularly to improvements in pneumatic suspension arrangements. Still more particularly, the invention relates to a suspension arrangement whose parts provide a closed pneumatic system for flow of air or other suitable gas.

SUMMARY OF THE INVENTION

It is an object of my invention to provide a novel and improved pneumatic suspension arrangement which occupies little room in an automotive vehicle, which is of lightweight construction, and which is designed and assembled in such a way that the leakage of compressed gas is reduced to a minimum.

Another object of the invention is to provide a novel pressure vessel for use in a suspension arrangement of the just outlined character.

A further object of the invention is to provide a suspension arrangement which can be installed in many types of automotive vehicles.

An additional object of the invention is to provide a suspension arrangement whose operation is fully automatic and which can be adjusted to respond to a desired range of movements of the wheels with reference to the frame of an automotive vehicle.

Still another object of the invention is to provide a novel regulating unit which can control the flow of pneumatic fluid between the pressure vessel and the shock absorber or shock absorbers of a pneumatic suspension arrangement for automotive vehicles.

The improved suspension arrangement comprises a pressure vessel having first and second receptacles which respectively define first and second chambers for supplies of highly and less compressed gas, a partition between the two chambers and coupling means extending through the chambers and the partition and accommodating at least a portion of a compressor which is operative to pump gas from the second into the first chamber in response to drop of gas pressure in the first chamber to a preselected minimum level, a pneumatic shock absorber which can be installed between the frame and the wheel axle of the vehicle and is connected with the vessel by a conduit, and regulating means including valves mounted in the first and second chambers to control the flow of gas between the shock absorber and the respective chambers in dependency on changes in the condition of the shock absorber.

The valves are preferably operated by solenoids and seal the conduit from the respective chambers in response to deenergization of their solenoids. The means for energizing the solenoids in dependency on changes in the condition of the shock absorber may comprise a level detector which includes a two-way electric switch having a movable contact connected to the wheel axle.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
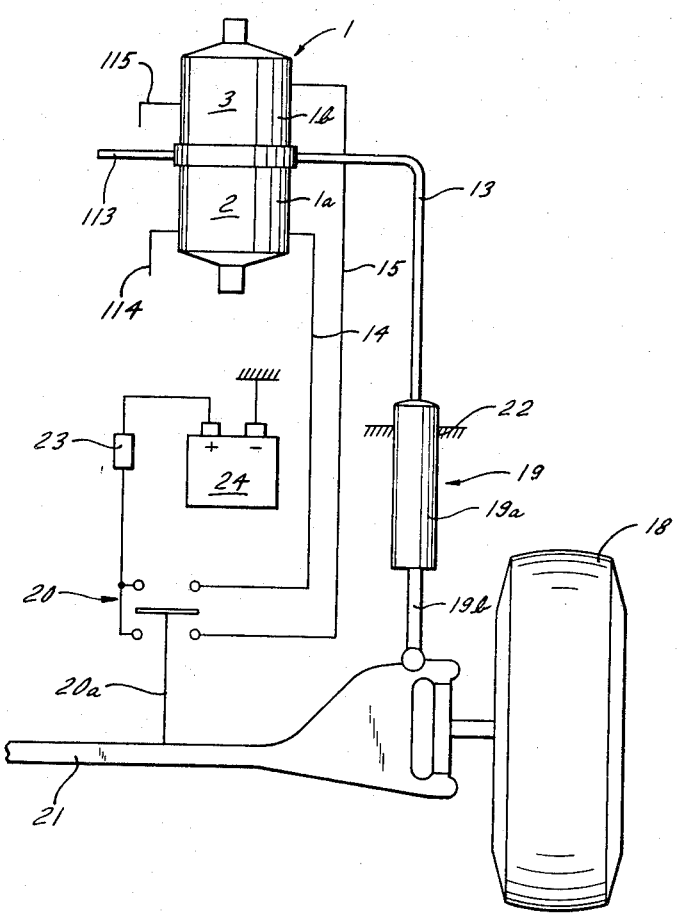
FIG. 1 is a fragmentary schematic vertical sectional view of an automotive vehicle and further shows a pneumatic suspension arrangement which embodies the invention.

FIG. 1 illustrates a portion of an automotive vehicle which embodies the improved pneumatic suspension arrangement. The illustrated portion of the vehicle comprises a frame 22 and an axle 21 for a road wheel 18. A pneumatic shock absorber 19 has an outer housing or shell 19a which is connected to the frame 22 and a piston rod 19b which is articulately connected to the axle 21. The shock absorber 19 can assume a plurality of conditions including a fully extended and a fully contracted condition. It is connected to a novel pressure vessel 1 by way of a single conduit 13 which can convey air or another suitable gas in either direction, depending on the condition of the shock absorber.

Figure 2:
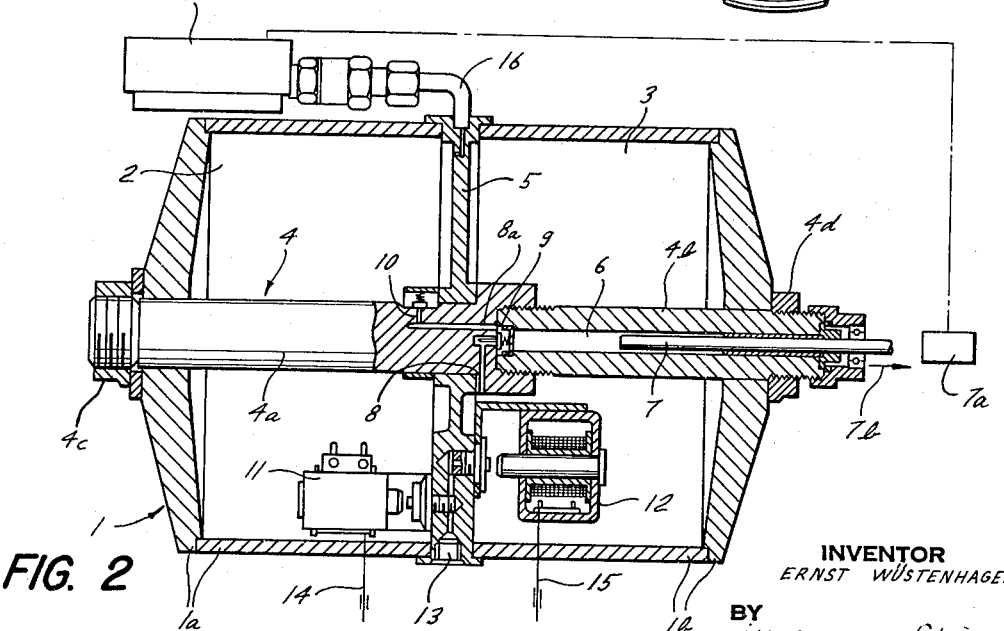
FIG. 2 is an enlarged axial sectional view of a pressure vessel in the arrangement of FIG. 1.

The details of the pressure vessel 1 are shown in FIG. 2. This vessel comprises two substantially cup-shaped receptacles or shells 1a, 1b which respectively define a first chamber or plenum chamber 2 for a supply of highly compressed gas and a second chamber 3 containing a supply of less compressed gas. A partition 5 is clamped between the receptacles 1a, 1b to seal the chambers 2, 3 from each other. The coupling means for connecting the receptacles 1a, 1b and for maintaining the partition 5 in sealing engagement with the adjoining open ends of the receptacles comprises an elongated anchor or spindle 4 which may consist of a single piece or of two or more interconnected components. In the illustrated embodiment, the anchor 4 comprises two sections 4a, 4b which are connected to each other by threads. The anchor extends centrally through the chambers 2, 3 and through the partition 5 and carries nuts 4c, 4d which bear against the bottom walls of the receptacles 1a, 1b.

The section 4b of the spindle is formed with an axially extending bore 6 which provides a cylinder chamber for a reciprocable piston or plunger 7 forming part of a compressor which serves to pump gas from the chamber 3 into the chamber 2 when the gas pressure in chamber 2 drops to a predetermined minimum value. The chamber or bore 6 is connected with the chamber 3 by way of at least one suction duct 8 and with the chamber 2 by way of at least one duct 8a. The flow of gas between the chambers 3, 6 is controlled by a one-way suction valve 9 which closes when the piston 7 performs a working stroke (in a direction to the left, as viewed in FIG. 2), and the flow of gas between the chambers 2, 6 is regulated by a relief valve 10 which opens when the piston 7 performs a working stroke provided that the gas pressure in duct 8a exceeds that in the chamber 2. The section 4b of the anchor 4 may accommodate the entire compressor or one or more compressor parts in addition to the piston 7. The drive of the compressor which reciprocates the piston 7 is shown schematically at 7a; this drive is connected with and begins to operate in response to signals received from a control unit including a conduit 16 which communicates with the chamber 2 by way of the partition 5 and a pressure switch 17 which is mounted in the conduit 16 and starts the drive 7a when the gas pressure in chamber 2 drops to a preselected minimum value. The switch 17 is preferably adjustable so that it can start the drive at a desired gas pressure in the chamber 2.

When the piston 7 moves outwardly (arrow 7b), the valve 10 is closed and the valve 9 opens so that the chamber 6 receives gas from the chamber 3. When the piston performs a working stroke, the valve 9 closes and the valve 10 opens if the gas pressure in chamber 6 and duct 8a suffices to lift the valve 10 off its seat in the section 4a. The piston 7 is sealingly received in the cylinder chamber 6.

The regulating unit which controls the flow of gas between the chambers 2, 3 and the interior of the shock absorber housing 19a by way of the conduit 13 comprises two solenoid-operated valves 11, 12 which are respectively installed in the chambers 2, 3 and seal the respective chambers from the conduit 13 in response to deenergization of their solenoids.

Conductors 14, 15 respectively connect the valves 11, 12 with a level detector 20 which serves to regulate the flow of gas in the conduit 13 as a function of changes in the condition of the shock absorber 19. This level detector 20 is a two-way electric switch whose fixed contacts are mounted on the frame 22 and whose movable contact 20a is connected to the axle 21. In order to stabilize the operation of the shock absorber 19, the detector 20 is connected with the battery 24 by way of a time-delay device 23 of known design. When the detector 20 connects the conductor 15 with the battery 24, i.e., when the axle 21 moves away from the frame 22 and the piston rod 19b moves outwardly (downwardly, as viewed in FIG. 1), the valve 12 in the chamber 3 opens and the piston rod 19b pumps gas from the housing 19a into the chamber 3 so that gas in the chamber 3 opposes expansion or extension of the shock absorber. When the detector 20 connects the battery 24 with the conductor 14, i.e., when the piston rod 19b moves upwardly, the chamber 2 admits compressed gas to the housing 19a by way of the valve 11 and conduit 13 whereby such gas opposes contraction of the shock absorber. The gas issuing from the chamber 2 returns the piston rod 19b to a neutral position.

The parts 1, 13, 19 provide a closed pneumatic system wherein the gas can flow from the chamber 3 into the chamber 2, from the chamber 2 into the housing 19b, and from the housing 19b into the chamber 3.

The vessel 1 can supply gas to or receive gas from all shock absorbers in an automotive vehicle. FIG. 1 shows an additional conduit 113 which is connected to an additional shock absorber (not shown). The conductors 114, 115 are connected to additional valves which correspond to valves 11, 12 and are mounted in the chambers 2, 3 to regulate the flow of gas through the conduit 113.

An important advantage of the improved suspension arrangement is that at least a portion (piston 7) of the compressor which supplies gas from the chamber 3 into the chamber 2 is accommodated directly in the coupling means 4 which holds the receptacles 1a, 1b and the partitioning means 5 together to prevent escape of compressed gases. In this way, the coupling means 4 performs the additional function of accommodating the shock absorber and of providing paths for the flow of gases from the chamber 3 into the chamber 2. Thus, the material of the coupling means is used with greater economy than in presently known arrangements.

Another advantage of the improved arrangement is that the valves 11, 12 are mounted directly in the respective chambers 2 and 3. This renders it possible to employ relatively simple and inexpensive valves and to practically exclude the possibility of leakage.

The exact design of the drive 7a for the piston 7 of the compressor forms no part of the present invention. This drive will be designed in dependency on the type of the vehicle in which the suspension arrangement is put to use. The pressure vessel 1 can be mounted in or on the frame 22 of the vehicle and may but need not be closely adjacent to one or more shock absorbers. This vessel preferably forms with the drive 7a a compact unit which is installed wherever there is room in or on the frame 22. The compactness of such unit is enhanced by the fact that the piston 7 of the compressor is accommodated in the interior of the vessel 1, i.e., in the interior of the section 4b which latter is accommodated in the chamber 3.

The shock absorber 19 may be provided with its own damping means of any known design. A single conduit 13 suffices to convey gas from the housing 19a to the vessel 1 or vice versa; this, too, contributes to the compactness and reduced cost of the arrangement. The shock absorber 19 may be of the type disclosed, for example, in Patent No. 2,410,176 to Magrum.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. In a pneumatic suspension arrangement for automotive vehicles, a combination comprising a pressure vessel having first and second receptacles respectivley defining a first chamber for a supply of highly compressed gas and a second chamber for a supply of less compressed gas, partitioning means between said chambers, and coupling means connecting said receptacles to each other; compressor means operative to pump gas from said second chamber into said first chamber, at least a portion of said compressor means being installed in said coupling means; a pneumatic shock absorber arranged to assume a plurality of conditions; conduit means connecting said shock absorber with said vessel; and regulating means for controlling the flow of gas between said chambers and said shock absorber by way of said conduit means, including first and second valves respectively installed in said first and second chambers.

2. A combination a defined in claim 1, wherein said coupling means comprises a portion extending through said second chamber and said portion of said compressor means is installed in said portion of said coupling means.

3. A combination as defined in claim 2, wherein said portion of said coupling means defines a cylinder chamber and said portion of said compressor means comprises piston means reciprocably received in said cylinder chamber.

4. A combination as defined in claim 1, wherein said valves are solenoid-operated valves.

5. A combination as defined in claim 4, wherein said conduit means comprises a single conduit and wherein said valves seal the respective chambers from said single conduit in deenergized condition of their solenoids.

6. A combination as defined in claim 1, further comprising pressure-responsive control means for initiating the operation of said compressor means in response to a drop of gas pressure in said first chamber to a predetermined minimum level.

7. A combination as defined in claim 6, wherein said control means comprises second conduit means communicating with said first chamber and a pressure switch in said second conduit means.

8. A combination as defined in claim 1, wherein said vessel, said conduit means and said shock absorber together constitute a closed pneumatic system.

9. A combination as defined in claim 8, wherein said regulating means further comprises detector means for detecting the condition of said shock absorber and for actuating said valves in dependency on changes in the condition of said shock absorber.

10. A combination as defined in claim 1, further comprising at least one additional shock absorber, additional conduit means connecting the additional shock absorber with said vessel, and additional regulating means for controlling the flow of gas between said chambers and said additional shock absorber by way of said additional conduit means.

References Cited
UNITED STATES PATENTS

| | | | |
|---|---|---|---|
| 2,673,733 | 3/1954 | Fitz John | 267—65 |
| 2,969,990 | 1/1961 | Szostak. | |

A. HARRY LEVY, Primary Examiner

U.S. Cl. X.R.

103—25; 280—124